US006542723B1

(12) United States Patent
Tong et al.

(10) Patent No.: US 6,542,723 B1
(45) Date of Patent: Apr. 1, 2003

(54) OPTOELECTRONIC PHASE LOCKED LOOP WITH BALANCED PHOTODETECTION FOR CLOCK RECOVERY IN HIGH-SPEED OPTICAL TIME DIVISION MULTIPLEXED SYSTEMS

(75) Inventors: Tak Kit Dennis Tong, Middletown, NJ (US); Giorgio Giaretta, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/503,036

(22) Filed: Feb. 11, 2000

(51) Int. Cl.[7] .............................. H04B 1/06; H04B 7/00
(52) U.S. Cl. ..................... 455/260; 455/118; 455/259; 455/264; 455/265; 375/373; 375/376; 331/17; 331/18; 332/127; 332/138
(58) Field of Search ................................. 455/118, 259, 455/260, 264, 265, 278.1; 375/215, 294, 296, 297, 327, 373, 376; 372/12, 18, 26; 359/111, 114, 115, 123, 135, 245; 332/127, 128, 138; 331/17, 18

(56) References Cited

U.S. PATENT DOCUMENTS

| | | | | |
|---|---|---|---|---|
| 5,723,856 A | * | 3/1998 | Yao et al. | 250/227.11 |
| 5,894,247 A | * | 4/1999 | Yoshida et al. | 331/18 |
| 6,370,169 B1 | * | 4/2002 | Imajuku et al. | 372/32 |

* cited by examiner

Primary Examiner—Edward F. Urban
Assistant Examiner—Temica M. Davis

(57) ABSTRACT

An optoelectronic phase locked loop for clock recovery in high-speed optical time division multiplexed systems. The optoelectronic phase locked loop includes a balanced photodetector through which the polarity ambiguity in error signal is resolved and the cancellation of laser noise enabling clock recovery with low timing jitter. The optoelectronic phase locked loop also includes an electroabsorption modulator as a phase detector, a lowpass filter, a variable controlled oscillator, a power divider and an amplifier.

8 Claims, 4 Drawing Sheets

OPTOELECTRONIC PHASE LOCKED LOOP WITH BALANCED PHOTODETECTION FOR CLOCK RECOVERY IN HIGH-SPEED OPTICAL TIME DIVISION MULTIPLEXED SYSTEMS

FIELD OF THE INVENTION

This invention relates to phase locked loops and more particularly to optoelectronic phase locked loops with balanced photodetection for clock recovery in high-speed optical time division multiplexed systems.

BACKGROUND OF THE INVENTION

High-speed optical time division multiplexing (OTDM) and wavelength division multiplexing (WDM) are key technologies to meet the bandwidth demand posed by data traffic up-surge. Clock recovery is important in OTDM receivers as it synchronizes operations such as demultiplexing and data regeneration. Single channel transmissions at rates such as 160 Gbit/s using photonic techniques for clock recovery have been achieved. These optoelectronic phase-locked loops (OE-PLL), however, include a low frequency dither signal. The dither signal, for example, may be incorporated in the loop to resolve polarity ambiguity in an error signal that arises from a DC offset proportional to average input optical power. The addition of a dither signal introduces extra system complexity and frequency modulation in the recovered clock. Although conventional oscillators and phase locked loops have been accepted, there exists a need for an OE-PLL in which the polarity ambiguity in the error signal is eliminated through balanced photodetection. Further, a need exists for a simplified system in which no dither signal is required in the loop and laser noise is cancelled through the balanced photodetection reducing timing jitter of the recovered clock. These features are particularly attractive to high-speed OTDM systems (>100 Gbit/s) when requirement on timing jitter becomes much stringent.

SUMMARY OF THE INVENTION

An aspect of the present invention provides an optoelectronic phase lock loop (OE-PLL) that includes a coupler coupled to a modulator and an attenuator. The coupler directs data to the modulator and the attenuator. Balanced photodetection is achieved by at least two serially connected photodetectors, for example, PD1 (first balanced photodetector) and PD2 (second balanced photodetector). The modulator is coupled to a first balanced photodetector. The modulator provides an error signal having a first dc offset to the first balanced photodetector. The attenuator is coupled to a second balanced photodetector and provides a second dc offset to the second balanced photodetector. The first and second balanced photodetectors provide a differential signal that corresponds to a difference of the error signal having the first dc offset and the second dc offset. The OE-PLL includes a voltage controlled oscillator (VCO) coupled to a divider and the first and second balanced photodetectors. The VCO provides a single frequency signal to the divider. The divider divides the single frequency signal into a recovered clock signal and a single frequency driving signal. The recovered clock signal is the output of the OE-PLL. Further, the single frequency driving signal is received by the modulator.

Another aspect of the present invention provides an optoelectronic phase lock loop that includes a coupler coupled to an electroabsorption (EA) modulator and a variable optical attenuator. The coupler splits a data stream to the EA modulator and the variable optical attenuator. The EA modulator is coupled to a power amplifier and a first balanced photodetector and provides an error signal having a first dc offset to the first balanced photodetector. The variable optical attenuator is coupled to a second balanced photodetector and provides a second dc offset to the second balanced photodetector. The first and second balanced photodetectors provide a differential signal to a lowpass filter that corresponds to a difference of the error signal having the first dc offset and the second dc offset. The lowpass filter is coupled to the first and second balanced photodetectors and a voltage controlled oscillator. The lowpass filter filters the differential signal and provides a correction signal to the VCO. The VCO is coupled to a power divider and provides a single frequency signal thereto having a frequency of oscillation proportional to the correction signal. The power divider is coupled to a power amplifier and splits the single frequency signal into a recovered clock signal and a single frequency driving signal. Further, the power amplifier amplifies the single frequency driving signal and provides the amplified signal to the EA modulator.

DETAILED DESCRIPTION OF THE INVENTION

Figure 1:
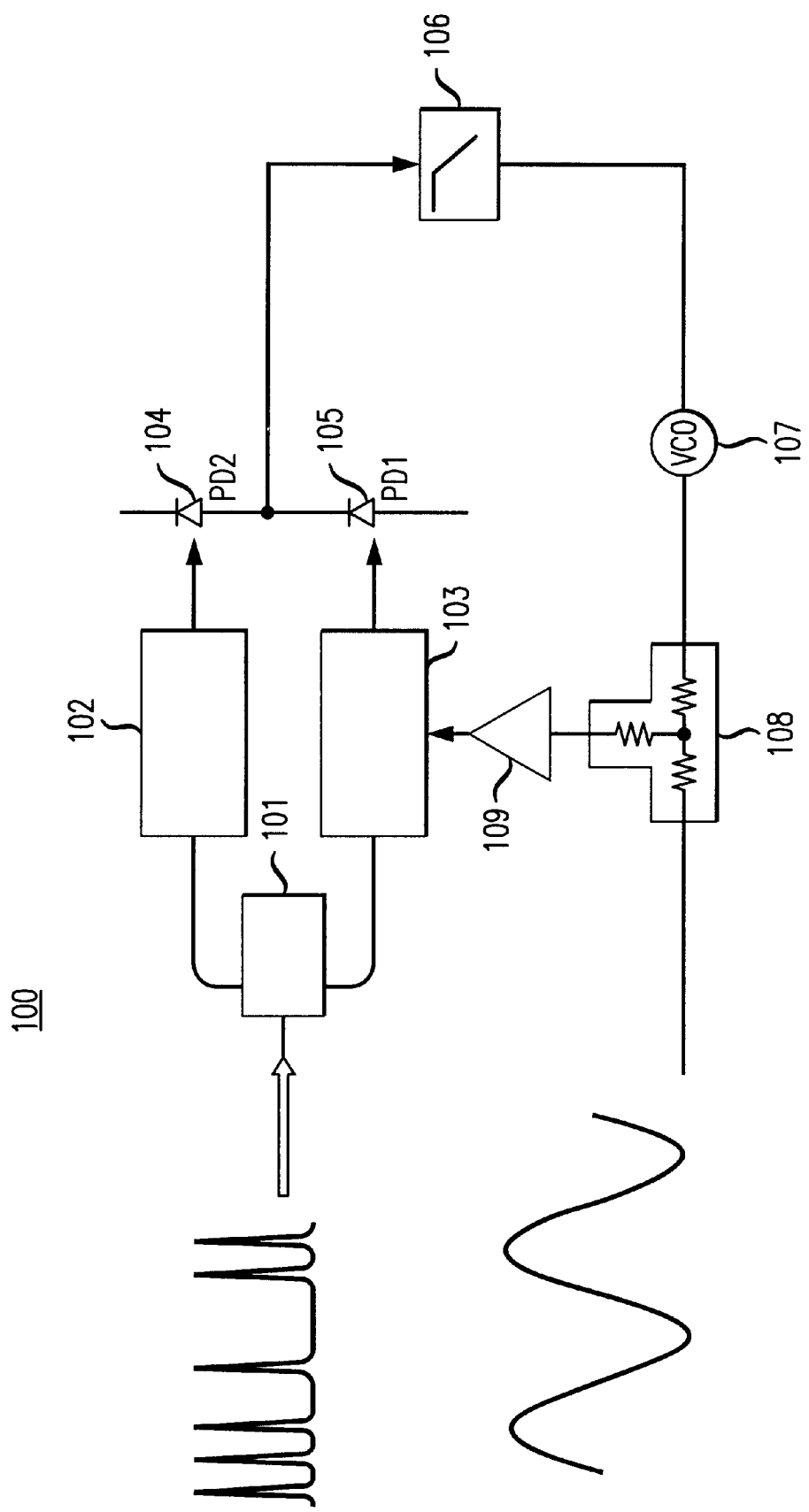
FIG. 1 shows an exemplary embodiment of an optoelectronic phase lock loop of the present invention.
Figure 2A:
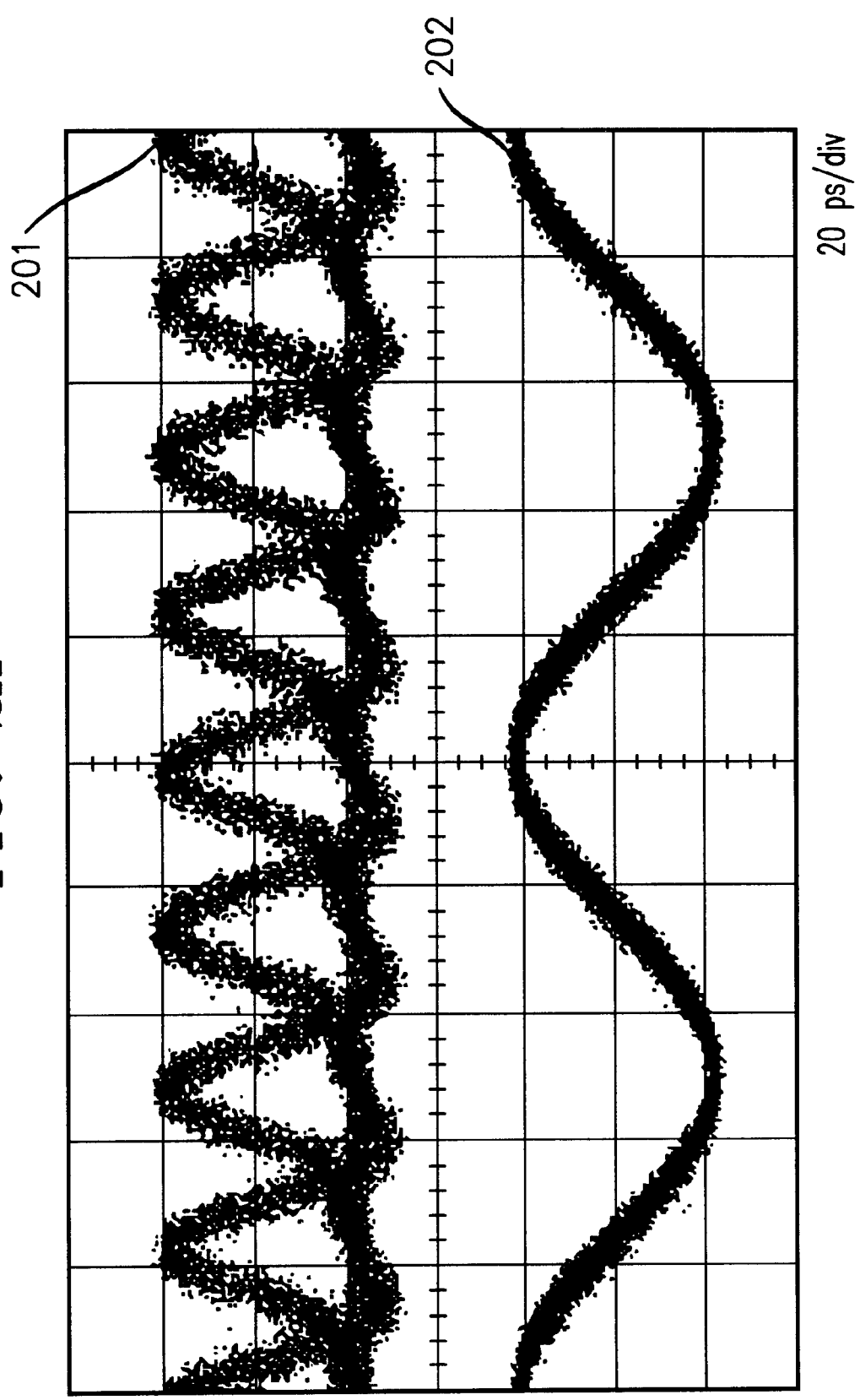
FIGS. 2(a) and 2(b) shows eye diagrams of data stream at 40 Gbit/s and (b) 80 Gbit/s, respectively, and the corresponding recovered clock signals at 10 GHz of an exemplary embodiment of the present invention.
Figure 2B:
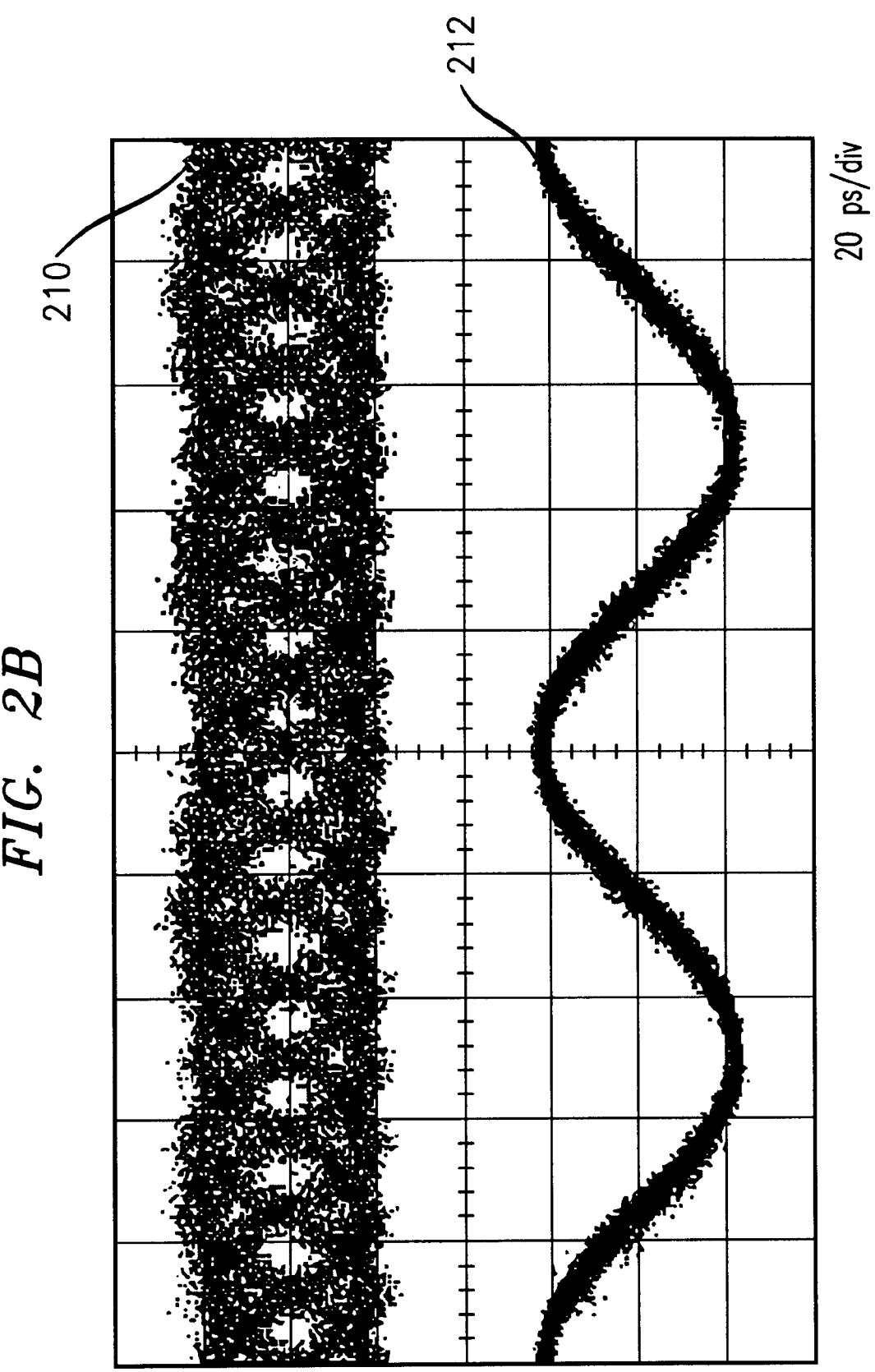

FIG. 1 shows an exemplary embodiment of an optoelectronic phase lock loop (OE-PLL) 100 of the present invention. The OE-PLL 100 includes a coupler 101 such as a 3-dB coupler for splitting input data such as high-speed optical time division multiplexing (OTDM) data to an attenuator 102 and a modulator 103. The input data may be, for example, a multiplexed OTDM data at 40 Gbit/s as shown in FIG. 2(a) as 201 or 80 Gbit/s as shown in FIG. 2(b) as 211. In an exemplary embodiment of the present invention, one half of the split data is launched through a variable optical attenuator 102 and the other half of the split data is sampled by an output of an oscillator 107 such as a voltage controlled oscillator (VCO) through an electroabsorption (EA) modulator 103. The EA modulator may be integrated with a semiconductor optical amplifier (SOA) that provides enough gain to compensate for insertion loss therein.

The VCO 107 operates at a predetermined clock frequency, for example, 10 GHz, with its phase to be locked onto the input data. In an exemplary embodiment of the present invention, the EA modulator 103 functions as an optoelectronic phase detector such that a phase difference between the input data and the output of the VCO 107 introduces a slow-varying modulation on the sampled output. The EA modulator 103 having a short switching window to allow OTDM data to be processed. Further, a plurality of EA modulators 103 may be cascaded to process higher speeds of OTDM data. In an exemplary embodiment of the present invention, the EA modulator 103 produces, for example, a 10 ps sampling window. This window is sufficient for clock recovery at 40 Gbit/s when driven by the amplified output of the VCO 107. With an input data rate of 80 Gbit/s, for example, clock recovery may be achieved with two concatenated EA modulators in the OE-PLL 100 to further reduce the switching window to 7 ps.

The OE-PLL 100 includes a pair of balanced photodetectors, PD1 104 and PD2 105. The EA modulator 103 provides PD1 104 with a photocurrent including a phase error signal induced by the slow-varying modulation and a DC offset. In an exemplary embodiment of the present invention, the DC offset is proportional to the average optical power of the sampled data. The DC offset causes the polarity ambiguity in the error signal.

In an exemplary embodiment of the present invention, the average optical power at PD2 105 is adjusted by an optical power adjusting circuit, component or device such as a variable optical attenuator 102. Adjusting the average optical power at PD2 105 results in the DC offset of the error signal provided by the first balanced photodetector PD1 104 to be eliminated resulting in the balanced output of the photodetectors 104, 105 to be a differential signal, e.g., the error signal without a DC offset.

Figure 3:
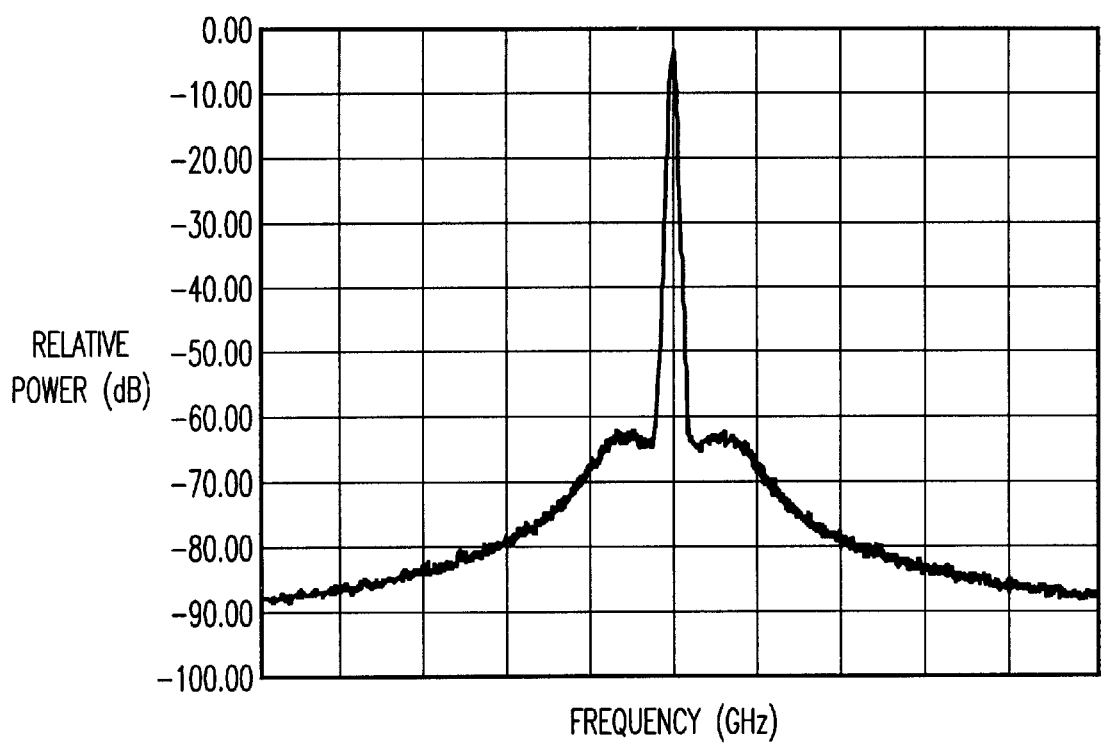
FIG. 3 shows a radio frequency (RF) spectrum of the recovered clock signals of FIG. 2(b) of an exemplary embodiment of the present invention at 10 GHz.

Subsequently, the error signal may be processed by a lowpass filter 106, for example, to reduce noise. The lowpass filter 106 provides a correction signal to the VCO 107 for phase tracking. In an exemplary embodiment of the present invention, the VCO 107 is coupled to a divider 108 such as a power divider. The VCO 107 provides a single frequency signal to the power divider 107 having a frequency of oscillation proportional to the correction signal. The power divider 107 may be coupled to an amplifier 109 such as a power amplifier. The power divider 108 splits the single frequency signal resulting in a recovered clock signal and a single frequency driving signal. The power amplifier receives and amplifies the single frequency driving signal and provides the amplified signal to the EA modulator. Exemplary eye diagrams of recovered clock signals are illustrated in FIGS. 2(a) and (b), for example, of multiplexed RZ data 201, 211 at 40 and 80 Gbit/s, respectively, and corresponding recovered clock signals at 10 GHz. FIG. 3 illustrates an RF spectrum of a recovered clock signal, for example, a 10 GHz recovered clock signal from a 80 Gbits/s data stream 211 shown in FIG. 2(b). The center frequency is depicted as 10 GHz, the span as 200 kHz and a resolution bandwidth (RBW) of 1 kHz.

In an exemplary embodiment of the present invention, the components of the OE-PLL may be manufactured with low-speed and low cost components as the bandwidth of the error signal is typically less than one MHz. Accordingly, in such an embodiment, the modulation bandwidth of the EA modulator need only accommodate the frequency of the VCO 107. The balanced photodetection in an exemplary embodiment of the present invention does not require a dither signal in the loop. Accordingly, the recovered clock is free of frequency modulation. Further, the balanced photodetectors 104, 105 cancels relative intensity noise (RIN) in the optical signal. As a result, noise generated by amplified spontaneous emission (ASE) from the optical amplifiers in conventional optical communication systems may be suppressed. Consequently, a recovered clock signal with low timing jitter is produced.

While the invention has been particularly shown and described with respect to an embodiment thereof, it will be understood by those skilled in the art that the foregoing and other changes in form and details may be made therein without departing from the spirit and scope of the invention.

We claim:

1. An optoelectronic phase lock loop comprising:
   a coupler coupled to a modulator and an attenuator, the coupler splitting data to the modulator and the attenuator;
   the modulator coupled to a first balanced photodetector, the modulator providing an error signal having a first dc offset to the first balanced photodetector;
   the attenuator coupled to a second balanced photodetector, the attenuator providing a second dc offset to the second balanced photodetector;
   the first and second balanced photodetectors outputting a differential signal, wherein the differential signal corresponds to a difference of the error signal having the first dc offset and the second dc offset;
   a voltage controlled oscillator (VCO) coupled to a divider and the first and second balanced photodetectors, the VCO providing a single frequency signal to the divider; and
   the divider splitting the single frequency signal into a recovered clock signal and a single frequency driving signal, wherein the single frequency driving signal being provided to the modulator.

2. The optoelectronic phase lock loop according to claim 1, wherein the modulator is an electroabsorption (EA) modulator.

3. The optoelectronic phase lock loop according to claim 1, wherein the attenuator is a variable optical attenuator.

4. The optoelectronic phase lock loop according to claim 1, wherein the divider is a power divider.

5. The optoelectronic phase lock loop according to claim 1, further comprising an amplifier coupled to the modulator and the divider, the amplifier amplifying the single frequency driving signal.

6. The optoelectronic phase lock loop according to claim 1, further comprising a lowpass filter coupled to the first and second balanced photodetectors and the power divider, the lowpass filter filtering the differential signal.

7. The optoelectronic phase lock loop according to claim 1, wherein the single frequency signal provided by the VCO has a frequency of oscillation proportional to the correction signal.

8. An optoelectronic phase lock loop comprising:
   a coupler coupled to an electroabsorption (EA) modulator and a variable optical attenuator, the coupler splitting a data stream to the electroabsorption (EA) modulator and the variable optical attenuator;
   the EA modulator coupled to a power amplifier and a first balanced photodetector, the EA modulator providing an error signal having a first dc offset to the first balanced photodetector;
   the variable optical attenuator coupled to a second balanced photodetector, the variable optical attenuator providing a second dc offset to the second balanced photodetector;
   the first and second balanced photodetectors providing a differential signal to a lowpass filter, wherein the differential signal corresponds to a difference of the error signal having the first dc offset and the second dc offset;
   the lowpass filter coupled to the first and second balanced photodetectors and a voltage controlled oscillator (VCO), the lowpass filter filtering the differential signal and providing a correction signal to the VCO;
   the VCO coupled to a power divider, the VCO providing a single frequency signal to the power divider having a frequency of oscillation proportional to the correction signal;
   the power divider coupled to a power amplifier, the power divider splitting the single frequency signal into a recovered clock signal and a single frequency driving signal; and
   the power amplifier receiving and amplifying the divided single frequency signal, the power amplifier providing the amplified signal to the EA modulator.

* * * * *